May 21, 1963 W. E. WOOLLENWEBER, JR., ETAL 3,090,544
AIR LUBRICATED BEARING
Filed May 2, 1962 2 Sheets-Sheet 2

INVENTORS
WILLIAM E. WOOLLENWEBER, JR.
BY & RICCARDO A. BOZZOLA

Lockwood, Woodard, Smith & Weikart
Attorneys

United States Patent Office

3,090,544
Patented May 21, 1963

3,090,544
AIR LUBRICATED BEARING
William E. Woollenweber, Jr., Columbus, and Riccardo A. Bozzola, Indianapolis, Ind., assignors to Schwitzer Corporation, Indianapolis, Ind., a corporation of Indiana
Filed May 2, 1962, Ser. No. 191,786
11 Claims. (Cl. 230—116)

This invention relates generally to air lubricated bearings and in particular to bearing apparatus for use in internal combustion engine turbochargers or the like utilizing air and oil, selectively, as bearing lubricants and having means for selecting either air or oil as the lubricant responsive to the turbocharger compressor outlet pressure.

The present invention discloses a simple, self-contained lubricating apparatus and system for, particularly, internal combustion engine turbochargers. Air supplied by the compressor component of the turbocharger is utilized to lubricate the turbocharger bearings whenever the turbocharger reaches a speed sufficient for the compressor to produce a positive air pressure of a predetermined value. Before the engine reaches this speed, that is, during idling or operation under very small load, lubricating oil under pressure is supplied to the turbocharger bearings from the lubricating system of the engine or from another source of lubricating fluid under pressure. The changeover from oil to air or air to oil lubrication is automatically accomplished by means responsive to the development of the required outlet pressure by the compressor component of the turbocharger.

The means referred to above is specifically disclosed herein as a control valve which closes the oil inlet valve and opens the air inlet valve to the bearings in response to a pressure in the compressor housing of a sufficient magnitude to provide the desired lubricating air pressure to the bearings.

It is an object of the present invention, therefore, to provide a system and apparatus for lubricating turbocharger bearings or the like utilizing air and oil, selectively, as lubricants for the bearings and incorporating means for automatically selecting which of the two lubricating mediums is to be supplied to the bearings.

A further object of the present invention is to provide a self-contained system for lubricating turbocharger bearings by air supplied from the compressor component of the turbocharger.

A further object of the present invention is to provide a control valve responsive to pressure in the compressor housing of a turbocharger for selectively controlling the flow of lubricating oil and air under pressure to the turbocharger bearings.

These and other objects will become apparent as the description proceeds with reference to the accompanying drawings in which.

Figure 1:
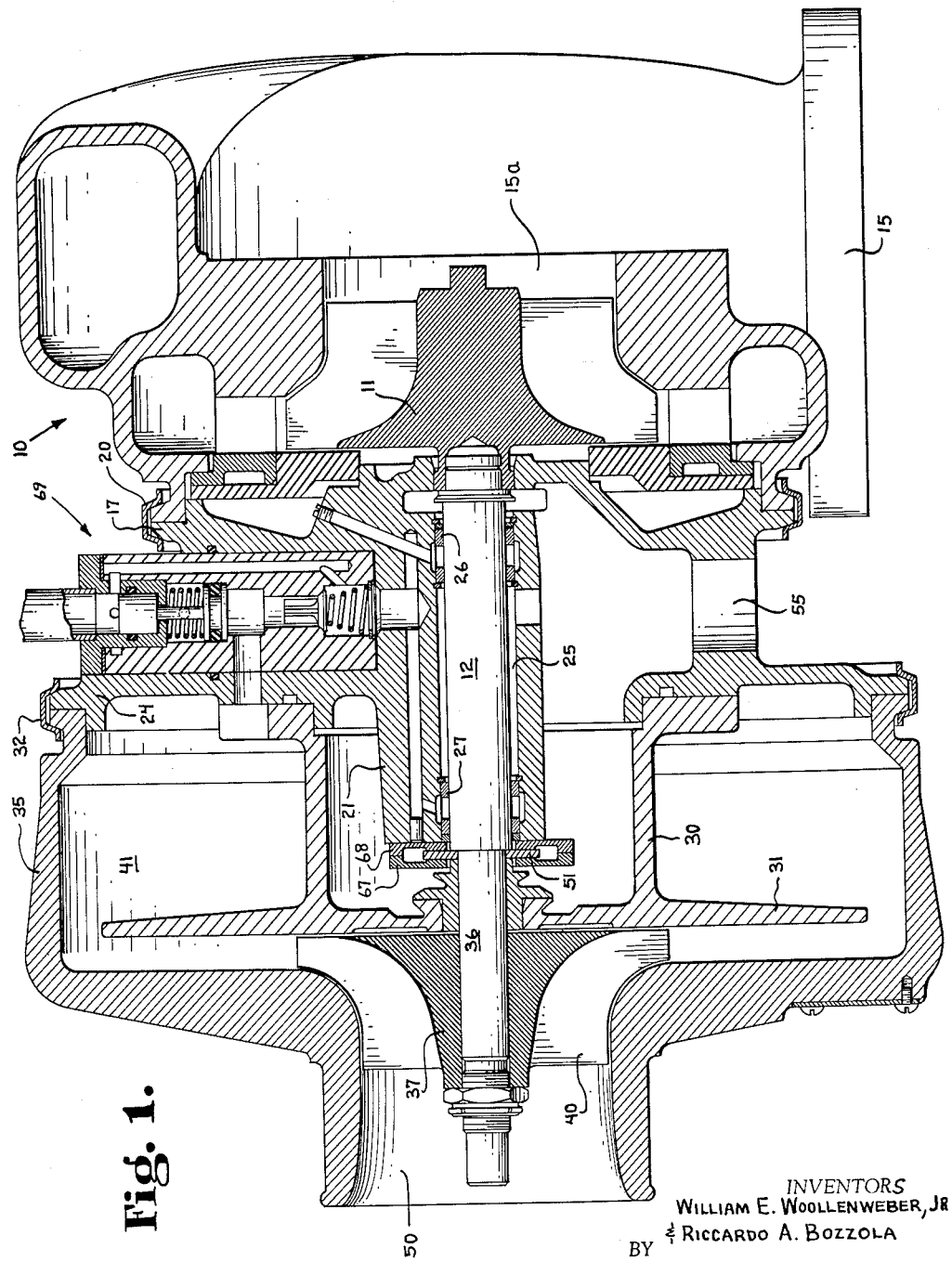
FIG. 1 is a side sectional view of an exhaust driven turbocharger for an internal combustion engine incorporating a system and apparatus of the present invention.

Referring particularly to FIG. 1, there is illustrated an exhaust gas driven supercharger which includes a turbine housing 10 enclosing a conventional bladed turbine wheel 11 adapted to drive the shaft 12. The turbine housing is provided with a flanged inlet passage 15 which transmits engine exhaust gases to the turbine wheel. The turbine, itself, is of conventional construction and operates in a conventional manner, that is, high pressure gases entering the turbine are expanded through the turbine wheel causing rotation thereof, the spent gases being discharged through the turbine outlet passage 15a.

Attached to the turbine housing 10 is an intermediate casting and bearing housing 17, the two castings being retained together in sealed relation by means of the clamp ring 20. The casting 17 is asymmetrical in configuration and includes a central portion 21 and an outwardly flanged portion 24 at one end of the central portion. The central portion 21 is provided with an aperture 25 through which the shaft 12 extends. Within this aperture, the central portion 21 carries rotary bearings sleeves 26 and 27 which allow free rotation of the shaft 12. Rigidly attached to the shaft and rotatable therewith is a thrust bearing member 51 which extends between stationary lubricant retainer members 67 and 68, both of which are rigidly attached to the adjacent end of the central portion 21.

Bolted to the flanged portion 24 of the casting 17 is a compressor backplate casting 30 having an outwardly flanged section 31. Also attached to the portion 24 of casting 17 by means of a clamp ring 32 is a compressor cover casting 35. The shaft 12 has an extending portion 36 of reduced diameter, said extending portion having mounted thereon a centrifugal type compressor rotor or wheel 37 carrying a plurality of blades 40. The compressor casting 35 is formed to provide a generally annular collector area 41 which receives high pressure gases delivered from the compressor. The collector area 41 communicates with a tangentially extending outlet or discharge passage (not shown), the passage being connected by suitable tubing (not shown) to the intake manifold of an internal combustion engine served by the turbocharger.

The compressor housing casting 35 is flanged to provide an inlet passage 50 which communicates with atmosphere or with the portion of the air induction system of the engine served by the turbocharger which is upstream of the inlet passage 50. When the engine upon which the turbocharger is installed is in operation, the exhaust gases will rotate the turbine wheel 11 to drive the compressor wheel 37. Rotation of the compressor wheel will charge the engine with compressed air thereby forcing into the engine cylinders a greater amount of air than could be drawn thereinto by the pumping action of the engine pistons. This charging action combined with increased fuel supply to the engine cylinders produces the increased power characteristic of supercharged engines.

There has been above described a generally conventional turbocharger and its operation has been referred to without reference to the lubricating arrangement of the present invention. In the conventional arrangement the journal bearings 26 and 27 are supplied with lubricating and cooling oil under pressure (supplied either by a separate oil pump or by the pressurized lubricating system of the engine) by means of lubricating fluid passages in the bearing housing casting 17. This oil, in the conventional lubricating system, circulates through the bearing area and exits through an aperture 55 to a suitable sump (not shown). As previously mentioned, in the system of the present invention lubricating oil and air are selectively circulated to the bearings.

Figure 2:
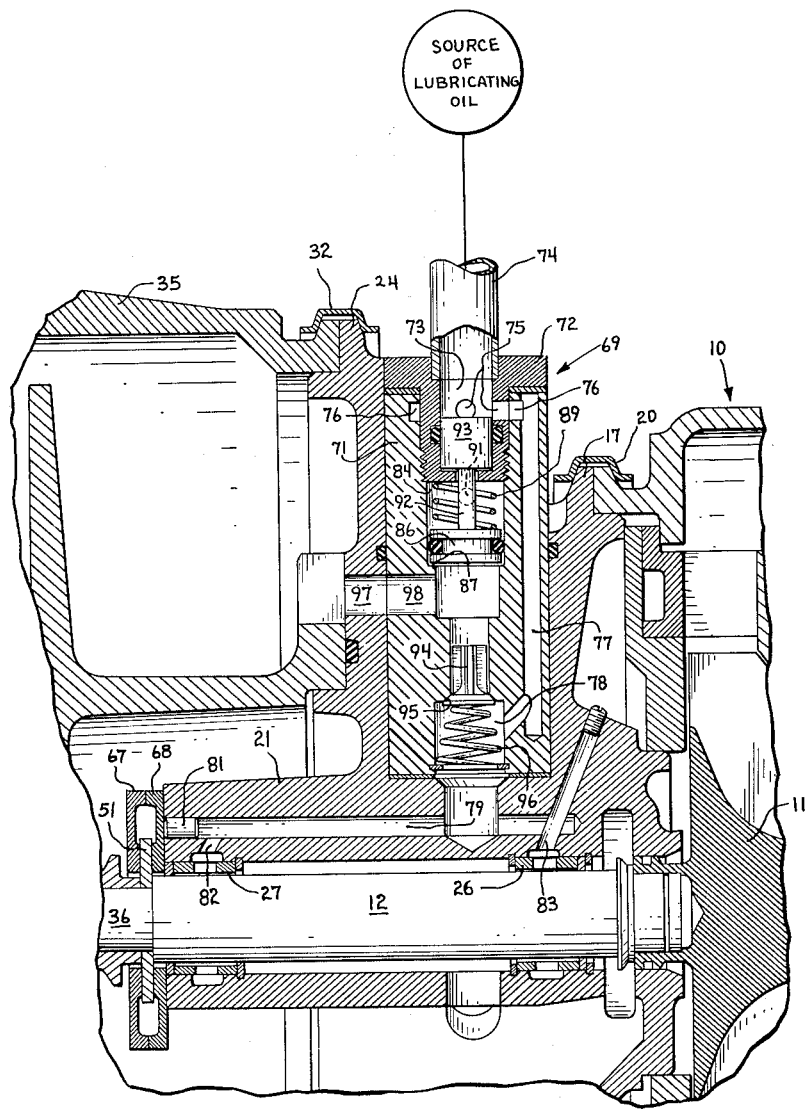
FIG. 2 is an enlarged side sectional view of the particularly pertinent portions of the structure of FIG. 1.

Referring now particularly to FIG. 2, the control valve forming the major component of the system of the present invention is identified generally by reference numeral 69 in both FIGS. 1 and 2. The casting 17 is apertured to receive the tubular body 71. The open outer end of the body 71 is closed by means of a threaded cap 72 having a central bore 73 therethrough which communicates with an oil inlet passage or line 74. In FIG. 2 the line 74 is illustrated as schematically connected to a source of lubricating oil under pressure and it will be understood that this source may be either a separate oil pump or might be the pressurized lubricating system of the engine served by the turbocharger. The body 71 is provided with an internal annular groove 76 which communicates with passages 75 extending radially sideward from the bore 73. The passages 75 and groove 76 provide communication between the bore 73 and longitudinal passage 77 formed in the sidewall of the body 71. At its base the passage 77 communicates with a chamber 78 axially disposed at the base of the body 71.

The chamber 78 communicates with one or more mutually communicating lubricating fluid passages 79 formed in the casting portion 21, the passage 79 being plugged at its left-hand end (as viewed in FIG. 2) by the plug 81. The lubricating fluid passage 79 communicates by means of the passages 82 and 83 with the area adjacent the journal bearings 27 and 26, respectively. It will be understood that one or more passages 79, 82 and 83 may be utilized and in this description and in the claims appended hereto the term lubricating passages refers to the passages 79, 82 and 83 collectively.

The tubular body 71 is provided with a central longitudinal bore 84 within which there is sealed but freely movable a piston or movable wall 86. One extreme position of the piston 86 is defined by the internal shoulder 87 formed within the valve body. Above the piston, and extending between the inner end of the cap 72 and the piston is a resilient means in the form of a compression spring 89. It will be understood that the spring 89, in the absence of pressure of sufficient magnitude below the piston, biases the piston downwardly against the shoulder 87.

In the chamber or area above the piston 86 is a vent opening 91 which permits the exit of air above the piston as it is moved upwardly. A further vent (not shown) is of course provided in the turbocharger casting 17 to discharge the air flowing through the bearings and to thus prevent the air pressure within the casting 17 from rising above atmospheric pressure to any substantial degree.

Extending upwardly from the piston 86 is a stem portion 92 which extends freely through an aperture in the cap 72 and extends further into the bore 73 of the cap. The upper end of the stem portion 92 bears against a valve member 93 which is slidable within the bore 73 and when moved to a position upwardly from its position of FIG. 2 closes off the passages 76 from communication with the lubricating fluid passages 79.

At the lower portion of the valve body 71 the bore 84 receives a valve member 94 which co-operates with a seat 95 formed in the valve body to close off the lower end of the bore 84. It will be noted that the valve member 94 is unconnected to the piston 86 and that the valve member 94 is biased into closed position by a resilient means in the form of a compression spring 96.

One or more air inlet passages 97 are formed in the flanged extending casting portion 24 and these passages register with radial passages 98 formed in the valve body, the passages 98 and the passages 97 being herein collectively referred to as air inlet passages. As will be evident from FIG. 2 the passages 98 communicate with the portion of the bore 84 which is below the piston 86. It will be obvious that when pressure on the upstream side of the valve member 94 builds up to a magnitude sufficient to overcome the force of biasing spring 96 and any pressure existing in cavity 78, the valve member 94 will be moved away from its seat 95 to provide communication between the air inlet passages and the lubricating fluid passages 79.

In operation, for the interval existing until the air pressure developed by the compressor is sufficient to lubricate the bearings, lubricating oil will be directed to the bearings. At the starting of the engine the component parts above described will be in the position shown in FIGS. 1 and 2. With the starting of the engine, oil pressure is relatively quickly developed in the oil lines and flows through the oil inlet 74, through the passages 75, through the groove 76 and passage 77, through the chamber 78 and from the chamber 78 into the lubricating fluid passages 79, 82 and 83. During a short interval after starting of the engine the turbocharger shaft bearings will thus be supplied with lubricating oil under pressure.

As the pressure developed by the compressor increases, this increased pressure will appear in the air inlet passages 97 and 98 and in the portion of the chamber 84 which is below the piston or movable wall 86. When this pressure attains a magnitude sufficient to overcome the force exerted by the spring 89, the piston 86 will be moved upwardly thereby moving the valve member 93 so as to block the passages 75 and cut off flow of lubricating oil to the bearings.

The pressure in the portion of the chamber 84 below the piston 86 also acts on the rear face of the valve member 94 and, when of sufficient magnitude, overcomes the biasing force of the spring 96 to open the valve member 94 by moving it away from its seat 95. This action introduces air under pressure into the lubricating fluid passages 79, 82 and 83 to provide air lubrication for the bearings. The air thus introduced into the bearings moves across the slight clearances existing between the shaft and the inner surfaces of the bearings, a vent in the turbocharger casting housing preventing any build up of air pressure within the central portion of the turbocharger housing.

If, during operation, the air pressure should drop below the predetermined pressure required to lubricate the bearings, the action in the control valve 69, just described, will be reversed causing lubricating oil to again be delivered to the bearings with the air pressure being cut off.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed:

1. A lubricating system for an internal combustion engine turbocharger wherein the turbocharger includes an air compressor driven by a turbine rotated shaft supported by spaced bearings: said system comprising means providing lubricating fluid passages to said bearings, means providing an air inlet passage exposed to the pressure generated by the compressor, means providing an oil inlet passage communicating with a source of lubricating oil under pressure, and a unitary control valve responsive to the air pressure generated by the compressor for selectively controlling communication of said air inlet passage or said oil inlet passage with said lubricating fluid passages as said air pressure generated by the compressor varies substantially above or below a predetermined value.

2. A lubricating system for an internal combustion engine turbocharger wherein the turbocharger includes an air compressor driven by a turbine rotated shaft supported by spaced bearings: said system comprising means providing lubricating fluid passages to said bearings, means providing an air inlet passage exposed to the pressure generated by the compressor, and a control valve responsive to the air pressure generated by the compressor for controlling communication of said air inlet passage with said lubricating fluid passages as said air pressure generated by the compressor varies substantially above or below a predetermined value.

3. A lubricating system for a rotating shaft supported by spaced bearings: said system comprising means providing lubricating fluid passages to said bearings, means providing a gas inlet passage communicating with a source of gas under pressure, means providing an oil inlet passage communicating with a source of lubricating oil under pressure, and a unitary control valve responsive to the gas pressure in said gas inlet passage for selectively controlling communication of said gas inlet passage or said oil inlet passage with said lubricating fluid passages as said gas pressure varies substantially above or below a predetermined value.

4. A lubricating system for an internal combustion engine turbocharger wherein the turbocharger includes an air compressor driven by a turbine rotated shaft supported by spaced bearings: said system comprising means providing a lubricating fluid passage to at least one of the bearings, means providing an air inlet passage exposed to the pressure generated by the compressor, means providing an oil inlet passage communicating with a source of lubricating oil under pressure, and control means responsive to the air pressure generated by the compressor for selectively controlling communication of said air inlet passage or said oil inlet passage with said lubricating fluid passage as said air pressure generated by the compressor varies substantially above or below a predetermined value.

5. A lubricating system for an internal combustion engine turbocharger wherein the turbocharger includes an air compressor driven by a turbine rotated shaft supported by spaced bearings: said system comprising means providing lubricating fluid passage to at least one of the bearings, means providing an air inlet passage exposed to the pressure generated by the compressor, and control means responsive to the air pressure generated by the compressor for controlling communication of said air inlet passage with said lubricating fluid passage as said air pressure generated by the compressor varies substantially above or below a predetermined value.

6. In an internal combustion engine turbocharger of the type incorporating in a single housing an engine exhaust gas driven turbine and a compressor driven by the turbine with the turbine and compressor rotors having a common shaft suppotred by thrust and journal bearings; apparatus for lubricating said bearings by lubricating oil or air selectively comprising: means providing lubricating fluid passages within said housing to said bearings, means providing an air inlet passage within said housing exposed to the pressure generated by said compressor, means providing an oil inlet passage communicating with a source of lubricating oil under pressure such as the lubricating system of the engine utilizing the turbocharger, and a control valve responsive to the pressure generated by the compressor for selectively controlling communication of said air inlet passage or said oil inlet passage with said lubricating fluid passages as said air pressure generated by the compressor varies substantially above or below a predetermined value.

7. An apparatus as claimed in claim 6 wherein said control valve includes a tubular body having a movable wall therein, a passage in said body communicating with said air inlet passage and with the space on one side of said movable wall for exposing said one movable wall side to the air pressure generated by the compressor, resilient means biasing said movable wall against the force exerted by said air pressure, a first valve operatively associated with said movable wall and open when said wall is in the position assumed when the pressure on said one wall side is insufficient to overcome the force of said resilient means, a second valve normally closed and movable to open position upon the air pressure within said body passage attaining a predetermined value, and means interposing said first valve between said oil inlet passage and said lubricating fluid passages and further interposing said second valve between said air inlet passage and said lubricating fluid passages.

8. In an internal combustion engine turbocharger of the type incorporating an engine exhaust gas driven turbine and a compressor driven by the turbine with the turbine and compressor rotors having a common shaft supported by thrust and journal bearings; apparatus for lubricating said bearings by lubricating oil or air selectively comprising: means providing lubricating fluid passages to said bearings, means providing an air inlet passage exposed to the pressure generated by said compressor, means providing an oil inlet passage communicating with a source of lubricating oil under pressure such as the lubricating system of the engine utilizing the turbocharger, and a control valve responsive to the pressure generated by the compressor for selectively controlling communication of said air inlet passage or said oil inlet passage with said lubricating fluid passages as said air pressure generated by the compressor varies substantially above or below a predetermined value.

9. An apparatus as claimed in claim 8 wherein said control valve includes a tubular body having a movable wall therein, a passage in said body communicating with said air inlet passage and with the space on one side of said movable wall for exposing said one movable wall side to the air pressure generated by the compressor, resilient means biasing said movable wall against the force exerted by said air pressure, a first valve operatively associated with said movable wall and open when said wall is in the position assumed when the pressure on said one wall side is insufficient to overcome the force of said resilient means, a second valve normally closed and movable to open position upon the air pressure within said body passage attaining a predetermined value, and means interposing said first valve between said oil inlet passage and said lubricating fluid passages and further interposing said second valve between said air inlet passage and said lubricating fluid passages.

10. In an internal combustion engine turbocharger of the type incorporating an engine exhaust gas driven turbine and a compressor driven by the turbine with the turbine and compressor rotors having a common shaft supported by thrust and journal bearings; apparatus for lubricating said bearings by air comprising: means providing a lubricating fluid passage to at least one of said bearings, means providing an air inlet passage exposed to the pressure generated by said compressor, and a control valve responsive to the pressure generated by the compressor for controlling communication of said air inlet passage with said lubricating fluid passage as said air pressure generated by the compressor varies substantially above or below a predetermined value.

11. Apparatus for lubricating spaced bearings supporting a rotating shaft by lubricating oil or gas selectively comprising: means providing lubricating fluid passages to said bearings, means providing a gas inlet passage communicating with a source of gas under pressure, means providing an oil inlet passage communicating with a source of lubricating oil under pressure, and a control valve responsive to the pressure in said gas inlet passage for selectively controlling communication of said gas inlet passage or said oil inlet passage with said lubricating fluid passages as said gas pressure in said gas inlet passage varies substantially above or below a predetermined value.

References Cited in the file of this patent

UNITED STATES PATENTS

| 2,937,294 | Macks | May 17, 1960 |
| 3,010,697 | Lazo et al. | Nov. 28, 1961 |